(12) United States Patent
Yang et al.

(10) Patent No.: US 10,509,883 B2
(45) Date of Patent: Dec. 17, 2019

(54) METHOD FOR LAYOUT GENERATION WITH CONSTRAINED HYPERGRAPH PARTITIONING

(71) Applicant: Taiwan Semiconductor Manufacturing Co., Ltd., Hsinchu (TW)

(72) Inventors: Tsun-Yu Yang, Changhua (TW); Wei-Yi Hu, Zhubei (TW); Jui-Feng Kuan, Zhubei (TW); Hsien-Hsin Sean Lee, Duluth, GA (US); Po-Cheng Pan, Hsinchu (TW); Hung-Wen Huang, Taoyuan (TW); Hung-Ming Chen, Zhubei (TW); Abhishek Patyal, Hsinchu (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 54 days.

(21) Appl. No.: 15/413,551

(22) Filed: Jan. 24, 2017

(65) Prior Publication Data
US 2018/0150585 A1    May 31, 2018

Related U.S. Application Data

(60) Provisional application No. 62/426,932, filed on Nov. 28, 2016.

(51) Int. Cl.
*G06F 17/50* (2006.01)
*G06F 9/455* (2018.01)

(52) U.S. Cl.
CPC ...... *G06F 17/5072* (2013.01); *G06F 17/5077* (2013.01); *G06F 17/5081* (2013.01); *G06F 2217/06* (2013.01); *G06F 2217/12* (2013.01)

(58) Field of Classification Search
USPC .......................................... 716/111, 113, 122
See application file for complete search history.

(56) References Cited

U.S. PATENT DOCUMENTS

| | | | | |
|---|---|---|---|---|
| 4,918,614 A | * | 4/1990 | Modarres | G06F 17/5072 716/122 |
| 5,699,265 A | * | 12/1997 | Scepanovic | G06F 17/5072 716/104 |
| 8,225,259 B1 | * | 7/2012 | Mendel | H03K 19/177 716/116 |

(Continued)

OTHER PUBLICATIONS

Tan, X.D., et al.; "Balanced multi-level multi-way partitioning of large analog circuits for hierarchical symbolic analysis;" IEEE; 1999; pp. 1-4.

(Continued)

*Primary Examiner* — Brian Ngo
(74) *Attorney, Agent, or Firm* — McClure, Qualey & Rodack, LLP

(57) ABSTRACT

A layout-generation method for an IC is provided. The layout-generation method includes accessing data of a schematic design of the IC; generating a hypergraph from the schematic design; transforming a plurality of constraints into a plurality of weighted edges in the hypergraph; continuing partitioning the hypergraph by the weighted edges until a plurality of multilevel groups are obtained to generate a layout; and verifying the layout to fabricate the IC.

20 Claims, 11 Drawing Sheets

(56) References Cited

U.S. PATENT DOCUMENTS

| | | | |
|---|---|---|---|
| 8,255,847 B1* | 8/2012 | Brissenden | G06F 17/5045 716/105 |
| 8,421,205 B2 | 4/2013 | Yang | |
| 8,661,389 B2 | 2/2014 | Chern et al. | |
| 8,698,205 B2 | 4/2014 | Tzeng et al. | |
| 8,826,212 B2 | 9/2014 | Yeh et al. | |
| 8,836,141 B2 | 9/2014 | Chi et al. | |
| 8,875,076 B2 | 10/2014 | Lin et al. | |
| 9,147,029 B2 | 9/2015 | Ke et al. | |
| 9,230,047 B1* | 1/2016 | Van Antwerpen | G06F 17/504 |
| 9,336,348 B2 | 5/2016 | Hsieh et al. | |
| 9,401,258 B2 | 7/2016 | Hung et al. | |
| 9,412,700 B2 | 8/2016 | Hsieh et al. | |
| 9,431,381 B2 | 8/2016 | Hsieh et al. | |
| 9,477,803 B2 | 10/2016 | Wang et al. | |
| 2003/0079192 A1* | 4/2003 | Cheong | G06F 17/5072 716/113 |
| 2003/0084416 A1* | 5/2003 | Dai | G06F 17/5045 716/55 |
| 2004/0044979 A1* | 3/2004 | Aji | G06F 17/5077 716/113 |
| 2005/0155006 A1* | 7/2005 | Subasic | G06F 17/5072 716/122 |
| 2007/0245281 A1* | 10/2007 | Riepe | G06F 17/5072 716/102 |
| 2008/0155485 A1* | 6/2008 | Lin | G06F 17/5072 716/123 |
| 2011/0055791 A1* | 3/2011 | Gao | G06F 17/5072 716/131 |
| 2012/0131530 A1* | 5/2012 | Moffitt | G06F 17/5027 716/113 |
| 2012/0137265 A1* | 5/2012 | Chang | G06F 17/5077 716/131 |
| 2014/0264924 A1 | 9/2014 | Yu et al. | |
| 2014/0282289 A1 | 9/2014 | Hsu et al. | |
| 2015/0007120 A1* | 1/2015 | Erickson | G06F 17/5054 716/105 |
| 2015/0100938 A1* | 4/2015 | Lu | G06F 17/5077 716/131 |
| 2015/0279453 A1 | 10/2015 | Fujiwara et al. | |
| 2015/0318241 A1 | 11/2015 | Chang et al. | |
| 2015/0347659 A1 | 12/2015 | Chiang et al. | |
| 2015/0357279 A1 | 12/2015 | Fujiwara et al. | |
| 2015/0370946 A1 | 12/2015 | Yang et al. | |
| 2016/0012169 A1 | 1/2016 | Chiang et al. | |
| 2016/0013271 A1 | 1/2016 | Chiang et al. | |
| 2016/0079162 A1 | 3/2016 | Hsieh et al. | |
| 2016/0126232 A1 | 5/2016 | Liu et al. | |
| 2016/0140276 A1* | 5/2016 | Sarhan | G06F 17/5045 716/103 |
| 2016/0147927 A1 | 5/2016 | Chiang et al. | |
| 2016/0276331 A1 | 9/2016 | Liaw | |

OTHER PUBLICATIONS

Long, D., et al.; "Signal-path driven partition and placement for analog circuit;" IEEE; 2006; pp. 694-699.

Pan, P.C., et al.; "A Fast Prototyping Framework for Analog Layout Migration With Planar Preservation;" IEEE Transactions on Computer-Aided Design of Integrated Circuits and Systems; Vo. 34; No. 9; Sep. 2015; pp. 1373-1386.

Ou, H C., et al.; "Cutting structure-aware analog placement based on self-aligned double patterning with e-beam lithography;" ACM; 2015; pp. 1-6.

Weng, Y.P., et al; "Fast analog layout prototyping for nanometer design migration;" IEEE; 2011; pp. 517-522.

Kahng, A.B., et al.; "Chip Optimization Through STI-Stress-Aware Placement Perturbations and Fill Insertion;" IEEE Transactions on Computer-Aided Design of Integrated Circuits and Systems; vol. 27; No. 7; Jul. 2008; pp. 1241-1252.

Ou, H.C., et al; "Layout-Dependent Effects-Aware Analytical Analog Placement;" ACM; 2015; pp. 1-6.

"Customized Analog Floorplanning via Constrained Hypergraph Partitioning;" ACM 2016; pp. 1-7.

* cited by examiner

US 10,509,883 B2

METHOD FOR LAYOUT GENERATION WITH CONSTRAINED HYPERGRAPH PARTITIONING

CROSS REFERENCE TO RELATED APPLICATIONS

This application claims the benefit of U.S. Provisional Application No. 62/426,932 filed on Nov. 28, 2016, the entirety of which is incorporated by reference herein.

BACKGROUND

As semiconductor technology continuously advances, layout-dependent effects (LDEs) have become crucial issues in analog circuit design. Characteristics like threshold voltage and mobility of devices are sensitive to LDEs. Moreover, an imperfect layout structure affects performance in unexpected ways. As such, layout-generation in recent analog circuit design is challenged by LDEs. Regarding LDE optimization, a layout-generating method is needed to automatically and efficiently consider these LDEs as constraints during the partitioning and floorplanning stages.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1A:
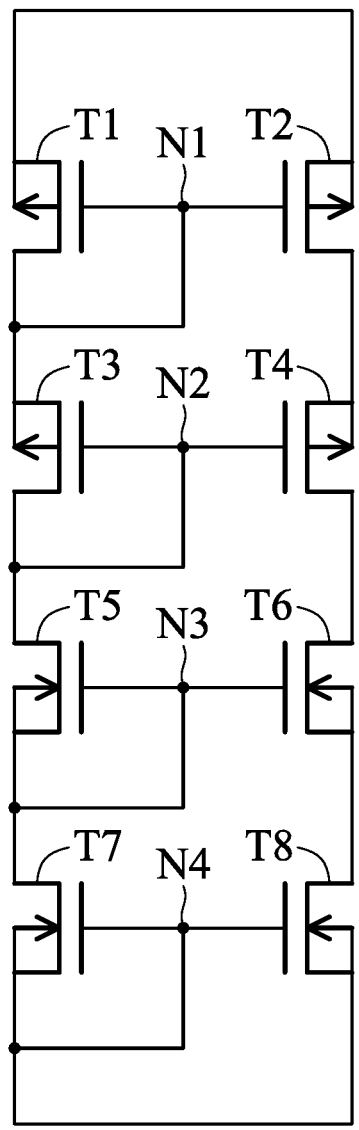
FIG. 1A is a schematic diagram of a netlist illustrating a schematic design, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in some various examples. This repetition is for the purpose of simplicity and clarity and does not in itself dictate a relationship between some various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Some embodiments of the disclosure are described. Additional operations can be provided before, during, and/or after the stages described in these embodiments. Some of the stages that are described can be replaced or eliminated for different embodiments. Additional features can be added to the semiconductor device. Some of the features described below can be replaced or eliminated for different embodiments. Although some embodiments are discussed with operations performed in a particular order, these operations may be performed in another logical order.

FIG. 1A is a schematic diagram of a netlist illustrating a schematic design, in accordance with some embodiments. In the embodiment of FIG. 1A, data of a schematic design 10 of an IC is illustrated. Data of the schematic diagram is a netlist which illustrates the arrangement of a number of electronic components. For example, the electronic components can be active components and/or passive components, such as transistors, resistors, diodes, inductors and capacitors, but they are not limited thereto.

The schematic design 10 includes eight transistors T1~T8 which are a portion of the IC. Transistors T1, T2 and T3 are connected to node N1. Transistors T3, T4 and T5 are connected to node N2. Transistors T5, T6 and T7 are connected to node N3. Transistors T7 and T8 are connected to node N4.

Figure 1B:
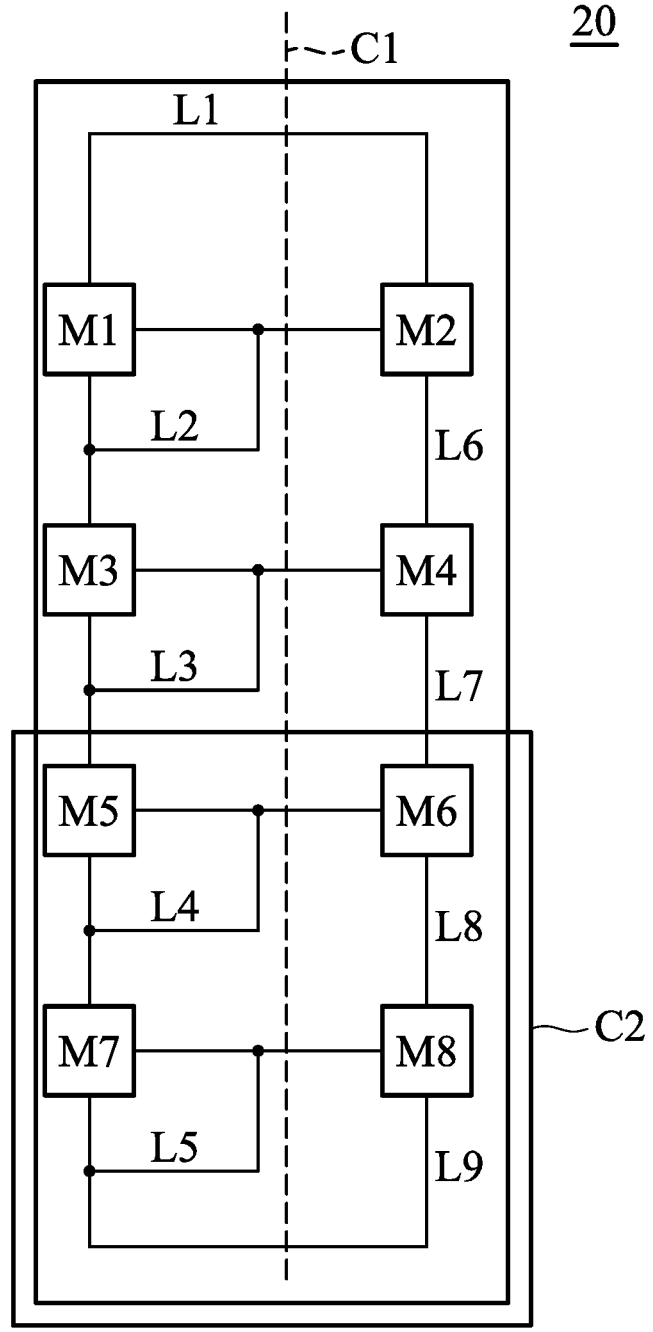
FIG. 1B is a schematic diagram of a hypergraph 20 in accordance with some embodiments.

FIG. 1B is a schematic diagram of a hypergraph 20 in accordance with some embodiments. The hypergraph 20 is generated from the schematic design 10 by Electronic Design Automation (EDA) tools or other circuit simulation tools and it is shown by a display. The hypergraph 20 includes a plurality of block domains M1~M8 representing electronic components of the schematic design and a plurality of linkages L1~L9 connecting the block domains M1~M8.

Specifically, transistors T1~T8 of schematic design 10 are transformed into block domains M1~M8 in the hypergraph 20. Linkages L1~L9 are utilized to illustrate the connections of the block domains M1~M8. For example, as shown in FIG. 1B, the linkage L2 connects the block domains M1, M2 and M3. The linkage L6 connects the block domains M3 and M4.

Furthermore, in some embodiments, the transistor-level schematic design 10 is transformed into a hypergraph of block domains based on two constraints C1 and C2 by EDA tools or other circuit simulation tools. The constraint C1 is a symmetry constraint which indicates that a group of the block domains is symmetric with another group of the block domains. As shown in FIG. 1B, block domains M1, M3, M5 and M7 are symmetric with block domains M2, M4, M6 and M8.

The constraint C2 is a proximity constraint which indicates that arrangements of some of the block domains are proximate with each other. As shown in FIG. 1B, block domains M5, M6, M7 and M8 are proximate with each other. In other words, block domains M5~M8 are regarded as a group without being separated.

Constraints are defined by users so that the circuits of the schematic design 10 can operate properly. For example, the schematic design 10 includes a differential pair of two transistors, and these two transistors should be proximate and close to each other. For example, the block domains M1 and M2 are differential pairs and should be proximate, the block domains M3 and M4 are differential pairs and should be proximate, and so on.

The schematic design may include a current mirror which is composed of a number of transistors, and the transistors should be arranged symmetrically to generate several identical currents.

Figure 1C:
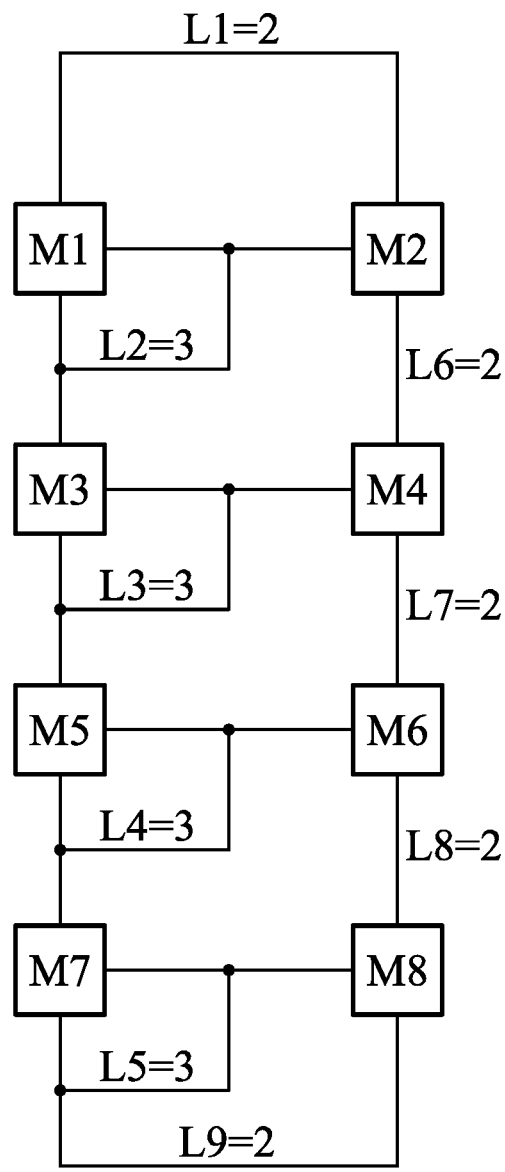
FIG. 1C is a schematic diagram of a hypergraph with weighted edges, in accordance with some embodiments.

FIG. 1C is a schematic diagram of a hypergraph 20 with weighted edges, in accordance with some embodiments. In some embodiments, weighted edges are assigned in some of the linkages to indicate degree of linkage. The weighted edges represent the routing amounts and the correlation degree between several block domains. The weighted edges are proportional to the routing amounts and the correlation degree. The routing is a wire for connecting the block domains. The correlation degree represents to what degree the block domain relates to each other.

As shown in FIG. 1C, the weighted edge of value 2 is assigned in the linkage L1, and the weighted edge of value 3 is assigned in the linkage L2. Therefore, the routing amounts of linkage L2 is more than the routing amounts of the linkage L1. The correlation degree of the linkage L2 is higher than the correlation degree of the linkage L1.

Figure 1D:
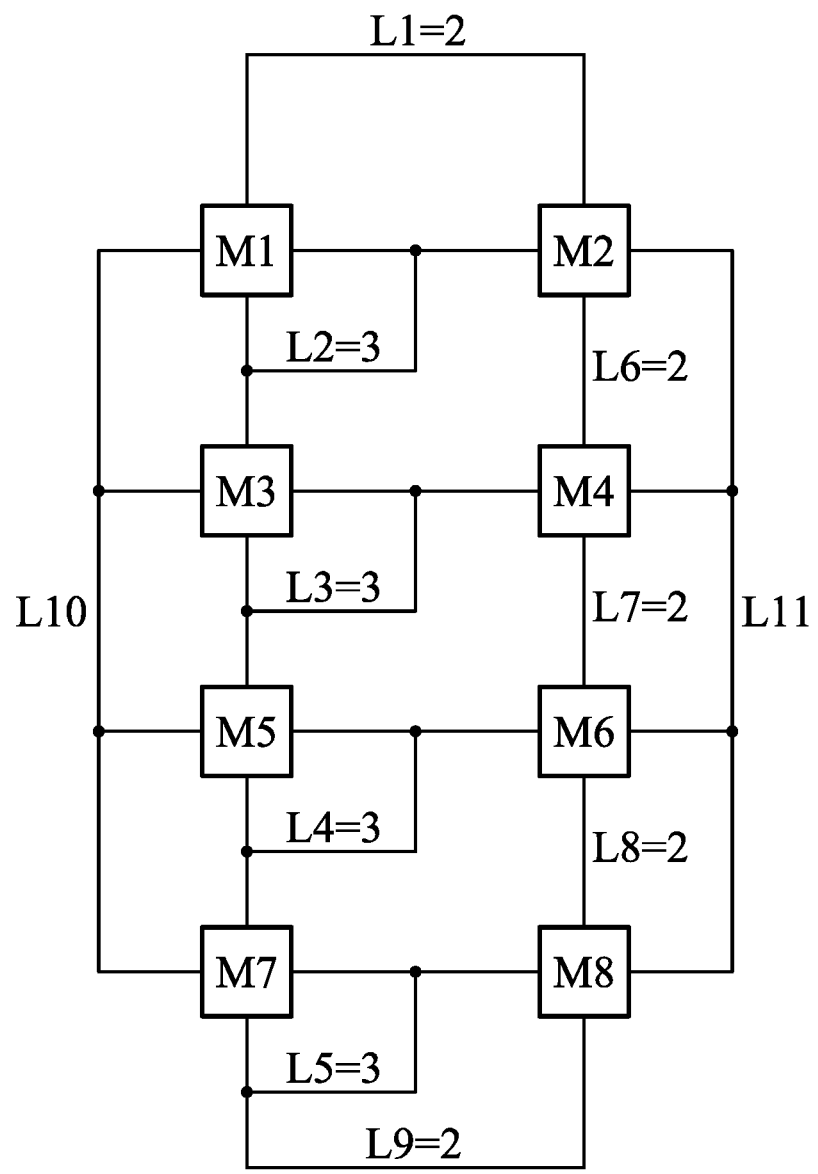
FIG. 1D is a schematic diagram of a hypergraph with weighted edges of symmetry constraints, in accordance with some embodiments.

FIG. 1D is a schematic diagram of a hypergraph 20 with weighted edges of symmetry constraints, in accordance with some embodiments. Two linkages L10 and L11 are developed to represent the symmetry constraints C1 by EDA tools or other circuit simulation tools. In some embodiments, constraints are transformed into a plurality of weighted edges in the hypergraph 20, and weighted edges are assigned in some of the linkages to indicate the degree of constraint by EDA tools or other circuit simulation tools.

For example, the value of the weighted edges of linkages L10 and L11 could be five, which is greater than the weighted edges of linkages L1~L8. During the partitioning and floorplanning stages, the symmetry constraint C1 should be taken into consideration with a higher priority than other linkages L1~L8.

Figure 1E:
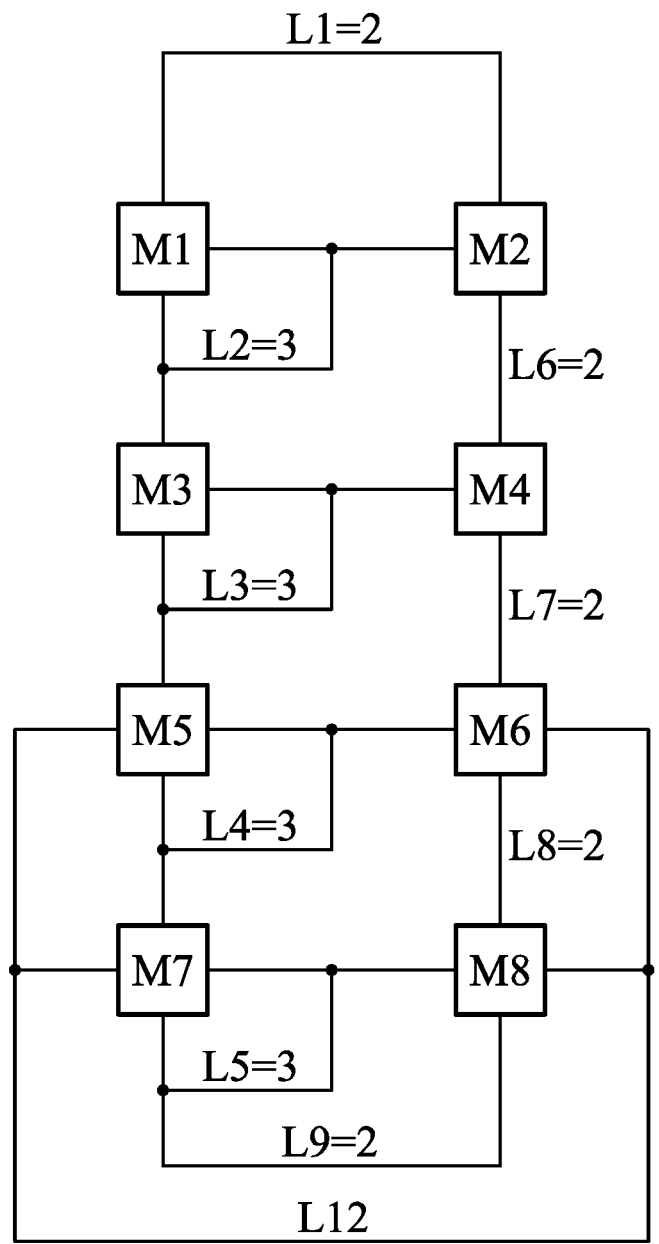
FIG. 1E is a schematic diagram of a hypergraph with weighted edges of proximity constraints, in accordance with some embodiments.

FIG. 1E is a schematic diagram of a hypergraph 20 with weighted edges of proximity constraints, in accordance with some embodiments. The linkage L12 is developed to represent the proximity constraints C2.

For example, the value of the weighted edge of linkage L12 could be five, which is greater than the weighted edges of linkages L1~L8. During the partitioning and floorplanning stages, the proximity constraint C2 should be taken into consideration with a higher priority than other linkages L1~L8.

The proposed layout-generation method takes constraints as weighted edges in both the partitioning and floorplanning stages. Since the constraints are transformed into weighted edges, partitioning can simultaneously deal with these constraints and generate the layout efficiently. Therefore, the location arrangements in the layout will be compact and tight. In addition, the total area of the layout can also be reduced accordingly.

Figure 2:
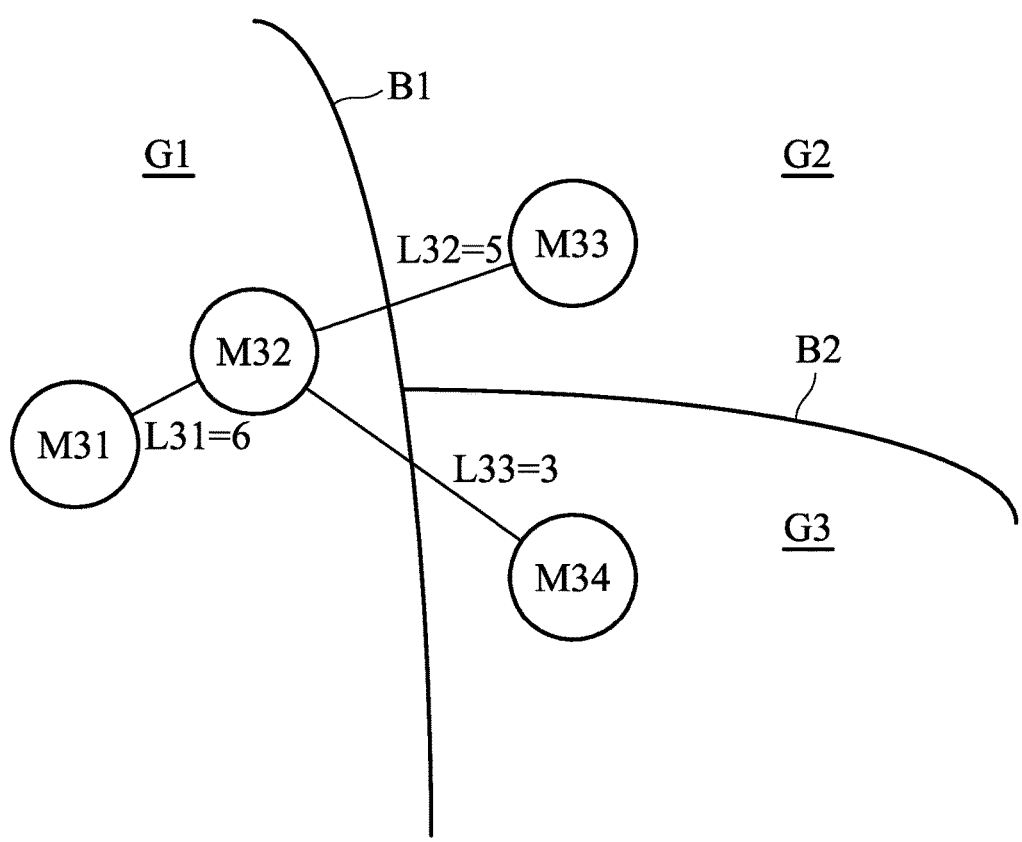
FIG. 2 is a schematic diagram of hypergraph partitioning, in accordance with some embodiments.

FIG. 2 is a schematic diagram of hypergraph partitioning, in accordance with some embodiments. In some embodiments, the multilevel groups could be obtained from partitioning the hypergraph 22 based on a first cost function. The first cost function includes degrees of the hypergraph 22 and weighted edges of the linkages L31~L33 to evaluate the cost of each of the multilevel groups M31~M34.

Details of the first cost function is described as follows:

$$\text{Cost}=\alpha(D\text{max})+\text{Cut}$$

In the above first cost function, parameter D is the degree of the hypergraph 22 to represent amounts and distribution of several multilevel groups G1~G3. The parameter of Cut is the weighted edges of the linkages to represent the routing amounts and the correlation degree between several block domains M31~M34.

As shown in FIG. 2, block domains M31 and M32 belong to multilevel group G1, block domain M33 belongs to multilevel group G2, and block domain M34 belongs to multilevel group G3. There is a boundary B1 between the multilevel groups D1 and D2, and there is a boundary B2 between the multilevel groups G2 and G3.

Regarding the parameter Cut of first cost function, the linkage L31 connects block domains M31 and M32, and its weighted edge is six. Linkage L32 connects block domains M32 and M33, and its weighted edge is five. Linkage L33 connects block domains M32 and M34, and its weighted edge is three.

Figure 3:
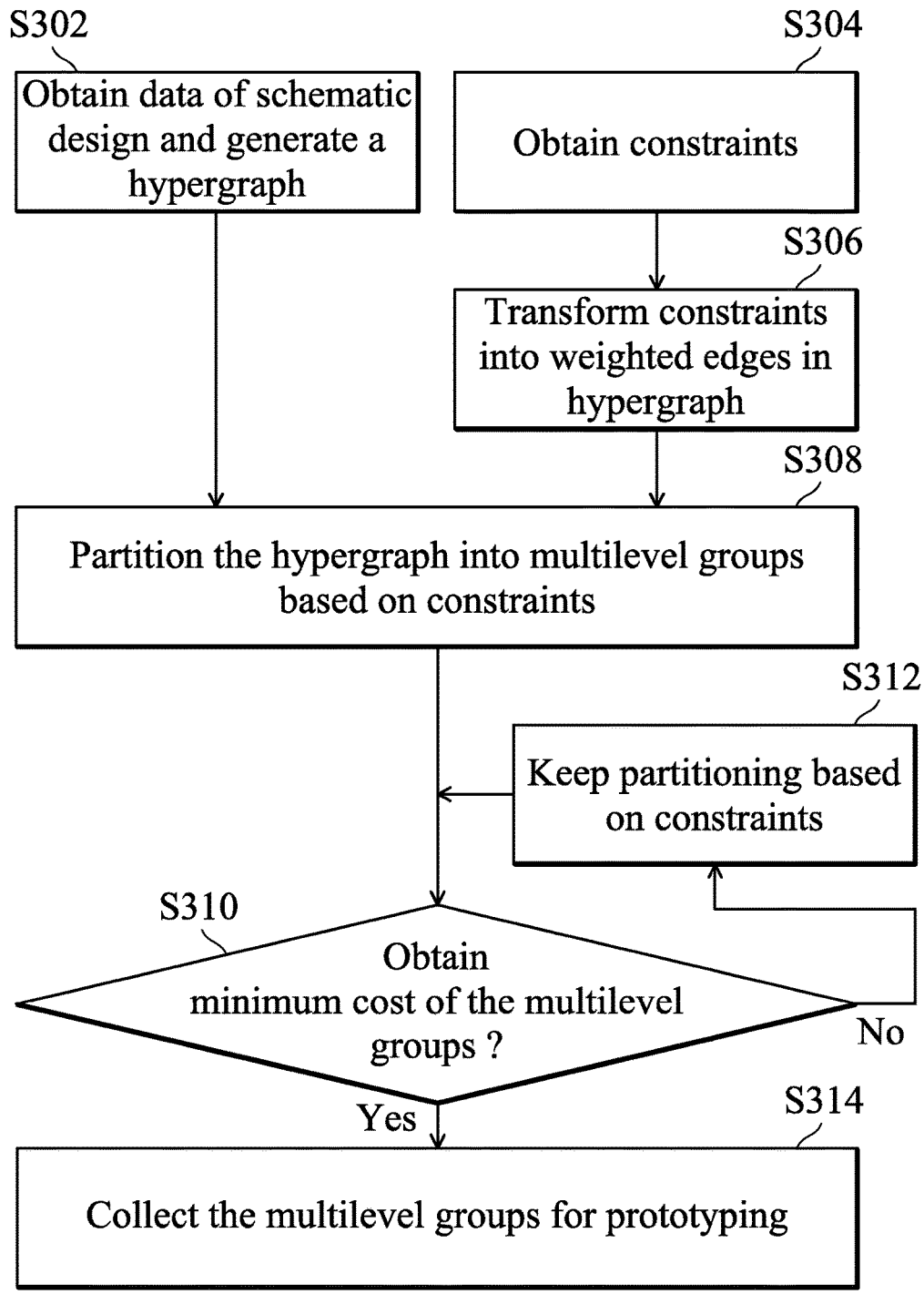
FIG. 3 is a flow chart of a method illustrating the operations for partitioning a hypergraph into multilevel groups, in accordance with some embodiments.

FIG. 3 is a flow chart of a method illustrating the operations for partitioning a hypergraph into multilevel groups, in accordance with some embodiments. In operation S302, data of the schematic design is obtained to generate a hypergraph by EDA tools or other circuit simulation tools. In operation S304, constraints are obtained from users for operating the schematic design by EDA tools or other circuit simulation tools. Afterwards, in operation S306, constraints are transformed into weighted edges in the hypergraph.

In operation S308, the hypergraph is partitioned and divided into multilevel groups based on constraints. In operation S309, a first cost function is applied to calculate the cost each time the hypergraph is partitioned. In operation S310, whether a minimum cost exists or not is determined by the first cost function, as illustrated above.

If a smaller cost can be obtained during the stage of partitioning, it means that the hypergraph can be partitioned further to obtain the multilevel groups. If a smaller cost cannot be obtained during the stage of partitioning, it means that the hypergraph cannot be further partitioned and the multilevel groups with minimum costs are derived accordingly.

It should be noted that the constraints are involved during the partitioning stage. For example, if some block domains are restricted with proximity constraints, these block domains with proximity constraints will not be partitioned or separated during the partitioning stage.

Regarding operation S310, if a minimum cost of the multilevel groups does not exist, operation S312 will be executed to keep on partitioning and continue partitioning based on the constraints. If a minimum cost of the multilevel groups exists, operation S314 will be executed to collect the multilevel groups for prototyping. By utilizing the first cost function, the level of multilevel groups can be minimized. It apparently diminishes the complexity of floorplanning and layout generation.

Figure 4A:
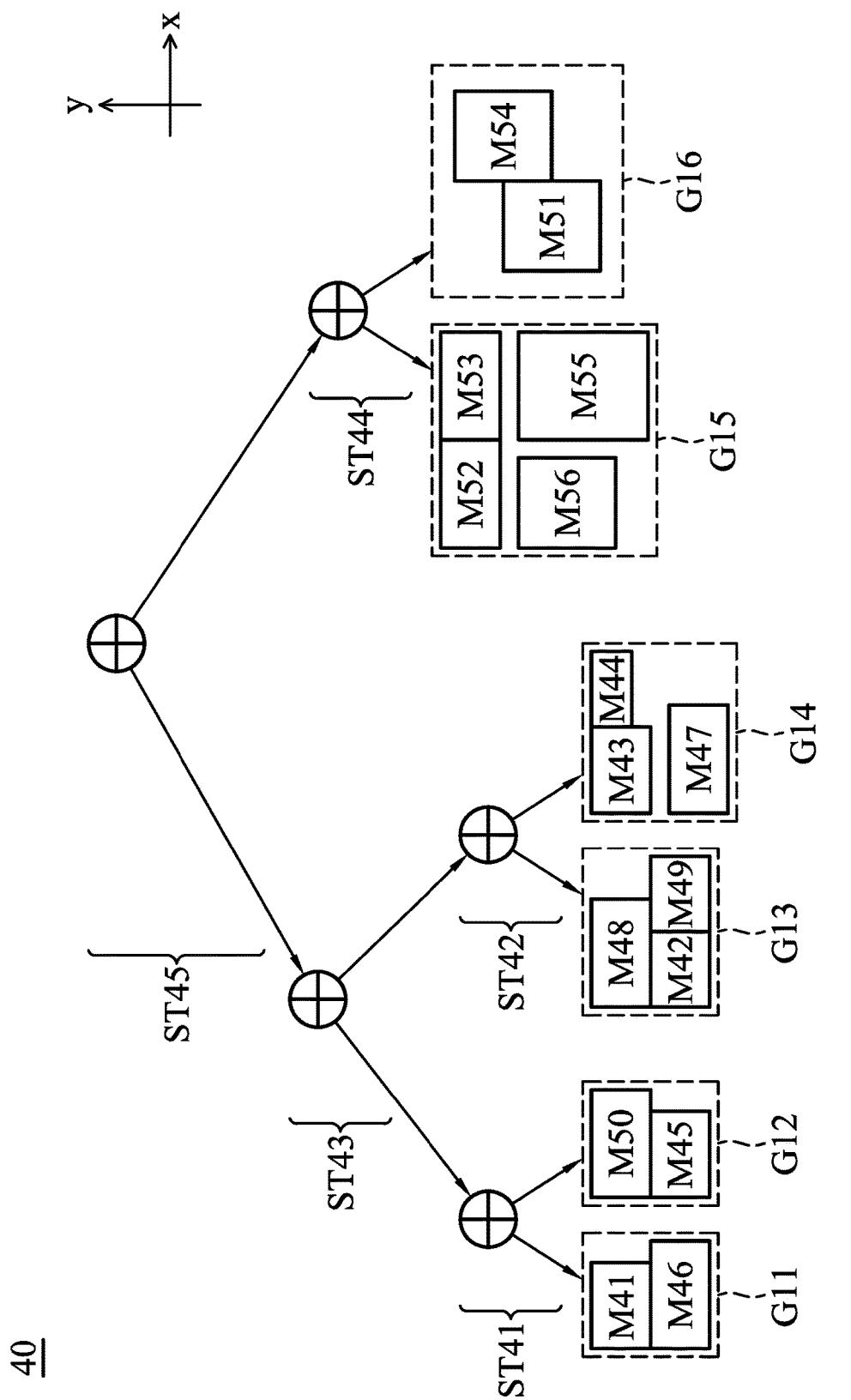
FIG. 4A~4C are schematic diagrams of floorplanning with constraints, in accordance with some embodiments.
Figure 4C:
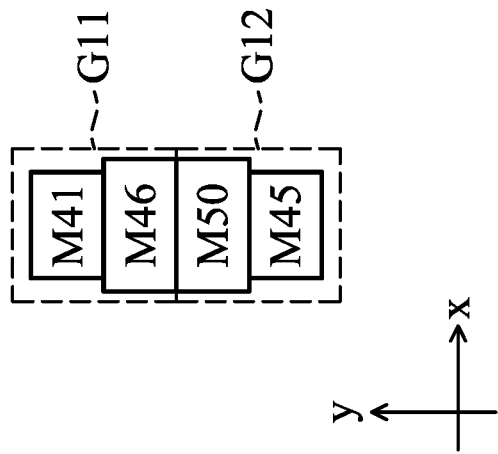
Figure 4B:
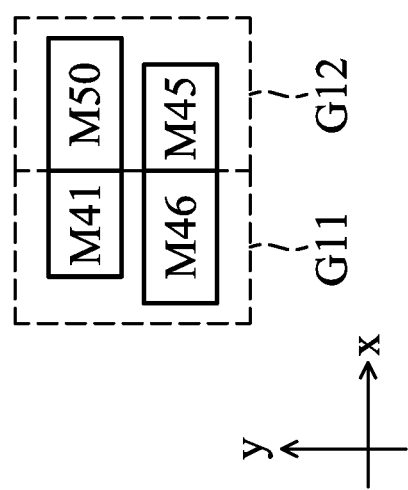

FIG. 4A~4C are schematic diagrams of floorplanning with constraints, in accordance with some embodiments. In some embodiments, after the partitioning stage, floorplanning is applied to the multilevel groups based on the partitioning to arrange the positions of the multilevel groups G11~G16.

A number of multilevel groups G11~G16 are illustrated in FIG. 4A, and each of the multilevel groups G11~G16 includes several bock domains respectively. For example, multilevel group G11 includes block domains M41 and M46, and multilevel group G12 includes block domains M45 and M50.

In some embodiments, floorplanning is utilized to decide on a horizontal arrangement or a vertical arrangement for the multilevel groups G11~G16 to generate the layout. As shown in FIG. 4A, Block domains M41 and M46 of multilevel group G11 are arranged along the Y direction, and block domains M450 and M50 of multilevel group G12 are arranged along the Y direction.

The multilevel groups G11 and G12 could be located in a horizontal arrangement or a vertical arrangement to form the sub-tree ST41 by EDA tools or other circuit simulation tools. In other words, the sub-tree ST41 is decided.

The horizontal arrangement of multilevel groups G11 and G12 is shown in FIG. 4B. The multilevel groups G11 and G12 are arranged along the X direction. The X direction is vertical to the Y direction.

In addition, the vertical arrangement of multilevel groups G11 and G12 is shown in FIG. 4B. The multilevel groups G11 and G12 are arranged along the Y direction. In other words, all of the block domains M41, M45, M46 and M50 are arranged along the Y direction.

The floorplanning is performed by bottom-up decisions. As shown in FIG. 4A, the sub-tree ST41 (with multilevel groups G11 and G12) and sub-tree ST42 (with multilevel groups G13 and G14) in the bottom area are decided. Furthermore, the sub-tree ST43 could be decided since it is composed of the sub-trees ST41 and ST42.

After the sub-trees ST41 and ST42 are decided, sub-trees ST43 and ST44 can be decided accordingly. Afterwards, the sub-tree ST45 in the top area can be decided.

In some embodiments, a second cost function is utilized for the floorplanning. The total cost of second cost function includes areas of the multilevel groups, wirelengths between the multilevel groups and aspect ratios of the multilevel groups.

$$\text{Total Cost} = \alpha \times \text{Area} + \beta \times \text{Wirelength} + C \times \text{AspectRatio}$$

Specifically, the second cost function is utilized to evaluate the total cost of all of the multilevel groups each time the floorplanning is applied. Since the total cost is proportional to the area, wirelength, and aspect ratio, the layout will be condensed and the layout size will be reduced as the total cost decreases. Therefore, a layout can be generated when the minimum total cost is determined.

In some embodiments, the layout is verified to fabricate the IC by EDA tools or other circuit simulation tools. The layout verification includes evaluating a constraint coverage and a routing coverage. The constraint coverage indicates the amount of constraints which are observed and obeyed. For example, when there are ten constraints and eight of them are observed, the constraint coverage is 80%.

The routing coverage is the ratio between the first automatic routing of the multilevel groups and the final routing of the multilevel groups. Routing represents wire connections between electronic components of the IC. The first automatic routing and the final routing are performed by circuit simulation tools. By utilizing the layout-generation method, the constraint coverage is greater than 80%, and the routing coverage is improved by at least 10%.

When the layout is verified and meet the requirement of IC design (such as the voltage gain or the bandwidth), it means that the layout is certified and the IC can be manufactured based on the certified layout. Afterwards, some semiconductor processes are performed on a wafer to manufacture at least one IC corresponding to the certified layout.

When the layout does not verified to meet the requirement of IC design, it means the layout is not certified, and the data for designing the IC needs to be revised and modified.

Figure 5:
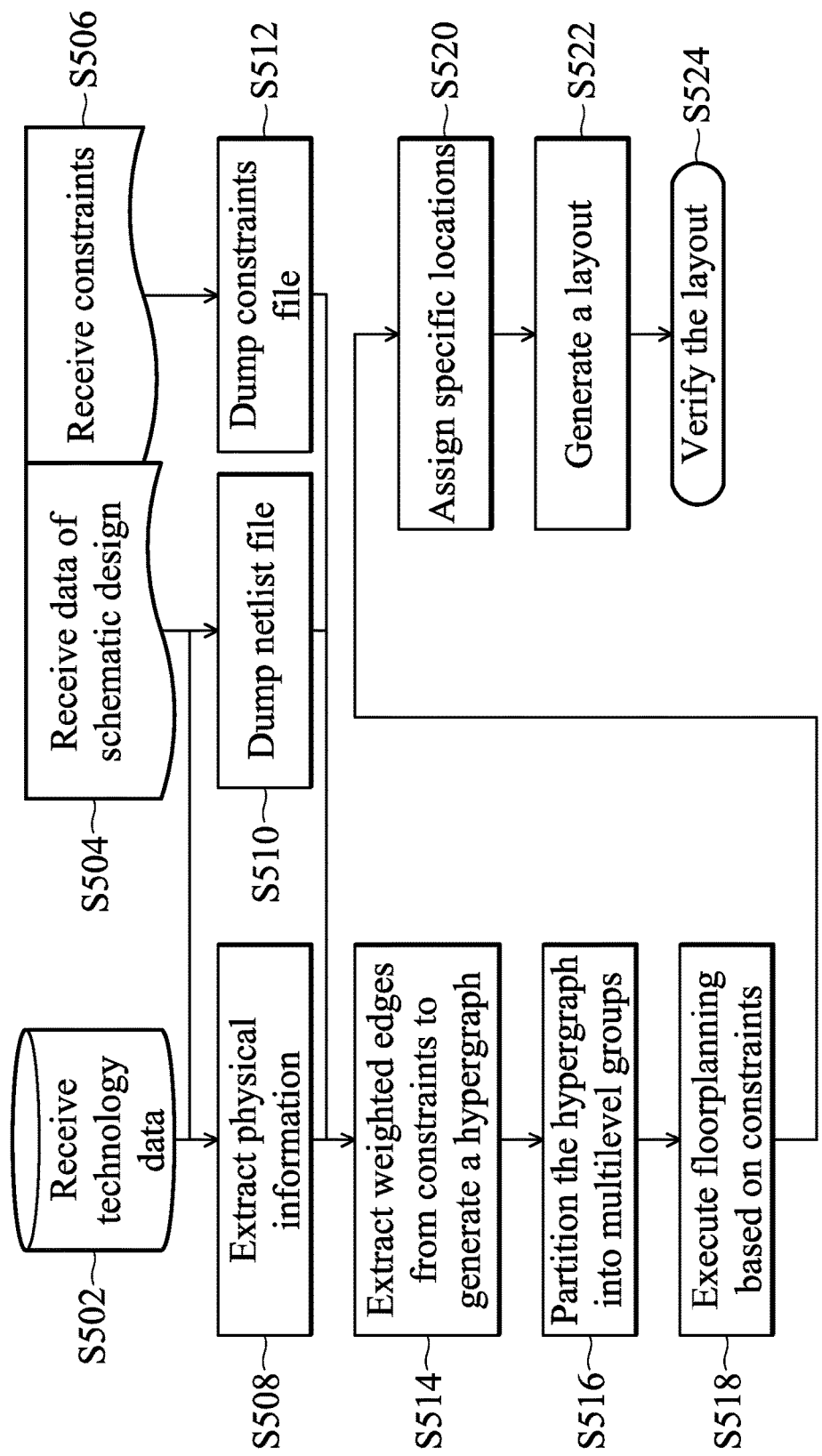
FIG. 5 is a flow chart of a method illustrating the operations for generating a layout, in accordance with some embodiments.

FIG. 5 is a flow chart of a method illustrating the operations for generating a layout by EDA tools or other circuit simulation tools, in accordance with some embodiments. In operation S502, technology data is received such as cell information, foundry data and design rules.

In operation S504, data of schematic design is received. In operation S506, constraints are received. In some embodiments, constraints defined by users are received by EDA tools or the processor which executes the EDA tools, so that the circuits of the schematic design can function and operate properly.

In operation S508, physical information is extracted from the schematic design and the technology data to provide necessary information for developing a hypergraph.

In operation S510, netlist file is dumped from the data of schematic design. In operation S512, constraint file is dumped from the received constraint in operation S506. The dumping in operations S510 and S512 means the conversion of the data format for the circuit simulation tool or computer system.

Afterwards, in operation S514, weighted edges are extracted from constraints to generate a hypergraph. In operation S516, the hypergraph is partitioned into multilevel groups. In operation S518, floorplanning is executed based on constraints and the partitions.

Furthermore, in operation S520, specific locations are assigned. For example, the power line and the ground are arranged as specific locations. In operation S522, a layout is generated. In operation S524, the layout is verified.

Figure 6:
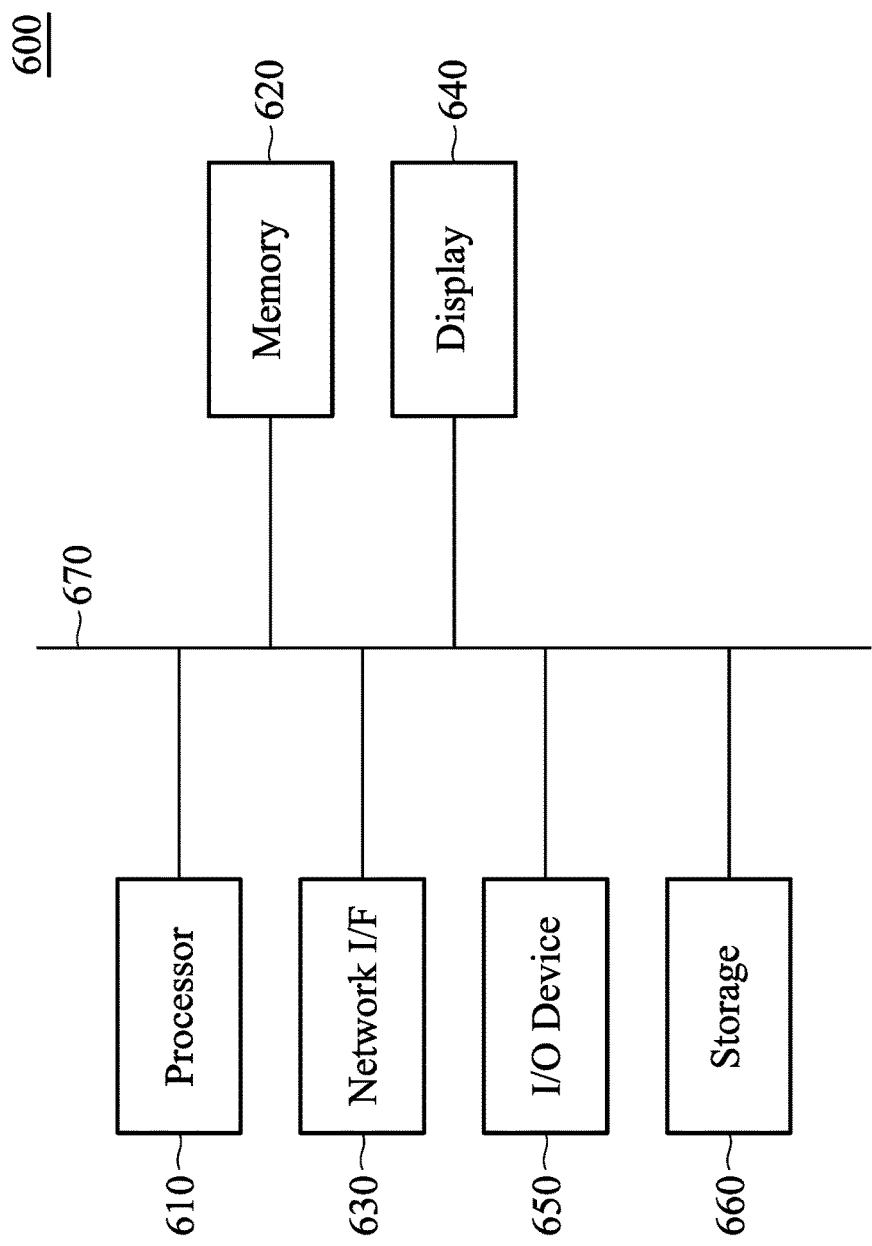
FIG. 6 is a block diagram of a computer system for generating a layout, in accordance with some embodiments.

FIG. 6 is a block diagram of a computer system for generating a layout, in accordance with some embodiments. One or more of the tools and/or systems and/or operations described with respect to FIGS. 1-5 is realized in some embodiments by one or more computer systems 600 of FIG. 6. The computer system 600 includes a processor 610, a memory 620, a network interface (I/F) 630, a display 640, an input/output (I/O) device 650, and one or more hardware components 660 communicatively coupled via a bus 670 or another interconnection communication mechanism.

The memory 620 comprises, in some embodiments, a random access memory (RAM) and/or other dynamic storage device and/or read only memory (ROM) and/or other static storage devices, coupled to the bus 670 for storing data and/or instructions to be executed by the processor 610. The memory 620 is also used, in some embodiments, for storing temporary variables or other intermediate information during execution of instructions to be executed by the processor 610.

The display 640 is utilized to display the RC netlist and the layout of the IC. The display 640 can be liquid-crystal panels or touch display panels. The I/O device 650 includes an input device, an output device and/or a combined input/output device for enabling user interaction with the computer system 600. An input device comprises, for example, a keyboard, keypad, mouse, trackball, trackpad, and/or cursor direction keys for communicating information and commands to the processor 610. An output device comprises, for example, a display, a printer, a voice synthesizer, etc. for communicating information to the user.

In some embodiments, one or more operations and/or functions of the tools and/or systems described with respect to FIGS. 1-6 are realized by the processor 610, which is programmed for performing such operations and/or functions. One or more of the memory 620, the I/F 630, the display 640, the I/O device 650, the hardware components 660, and the bus 670 is/are operable to receive instructions, data, design rules, netlists, layouts, models and/or other parameters for processing by the processor 610.

In some embodiments, one or more of the operations and/or functions of the tools and/or systems described with respect to FIGS. 1-6 is/are implemented by specially configured hardware (e.g., by one or more application-specific integrated circuits or ASIC(s)) which is/are included) separate from or in lieu of the processor 610. Some embodiments incorporate more than one of the described operations and/or functions in a single ASIC.

In some embodiments, the operations and/or functions are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

By utilizing the proposed layout-generation method, weighted edges are extracted from schematic design and constraints to generate a hypergraph. Afterwards, the hypergraph is partitioned into multilevel groups. In addition, floorplanning is executed based on constraints and the partitions to generate the layout. Since the constraints are transformed into weighted edges, partitioning can simultaneously deal with these constraints and generate a layout with a small size and condensed location arrangements.

In accordance with some embodiments, a layout-generation method for fabricating an IC is provided. The layout-generation method includes accessing data of a schematic design of the IC; generating a hypergraph from the schematic design; transforming a plurality of constraints into a plurality of weighted edges in the hypergraph; continuing partitioning the hypergraph by the weighted edges until a plurality of multilevel groups are obtained to generate a layout; and verifying the layout to fabricate the IC.

In accordance with some embodiments, a layout-generation method for fabricating an IC is provided. The layout-generation method includes accessing data of a schematic design of the IC; extracting weighted edges from a plurality of constraints; generating a hypergraph with weighted edges to represent the schematic design and the constraints; partitioning the hypergraph into a plurality of multilevel groups associated with the weighted edges; and executing floorplanning based on the partitioning to arrange the positions of the multilevel groups to generate a layout and fabricate the IC.

In accordance with some embodiments, the disclosure provides a non-transitory computer-readable medium containing instructions which, when executed by a processor of a computer system, cause the processor to execute a layout-generation method including accessing data of a schematic design of the IC; extracting weighted edges from a plurality of constraints; generating a hypergraph with weighted edges to represent the schematic design and the constraints; partitioning the hypergraph into a plurality of multilevel groups associated with the weighted edges; and executing floorplanning based on the partitioning to arrange positions of the multilevel groups to generate a layout and fabricate the IC.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A layout-generation method for fabricating an integrated circuit (IC), comprising:
   accessing data of a schematic design of the IC;
   generating a hypergraph from the schematic design
   transforming a plurality of constraints into a plurality of weighted edges in the hypergraph;
   applying a first cost function to continue partitioning the hypergraph by the weighted edges during a partitioning stage until a plurality of multilevel groups representing a plurality of electronic components and a plurality of linkages connecting the electronic components of the schematic design are obtained;
   after the partitioning stage, applying a second cost function to execute floorplanning for the multilevel groups to arrange positions of the multilevel groups to generate a layout, wherein the first cost function is different from the second cost function;
   verifying the layout; and
   fabricating the IC after verifying the layout.

2. The layout-generation method as claimed in claim 1, wherein the hypergraph comprises a plurality of block domains representing the electronic components of the schematic design and the linkages connecting the block domains, and the weighted edges are assigned in some of the linkages to indicate degree of constraint.

3. The layout-generation method as claimed in claim 2, wherein the constraints are symmetry constraints which indicate that a group of the block domains is symmetric with another group of the block domains.

4. The layout-generation method as claimed in claim 2, wherein the constraints are proximity constraints which indicate that arrangements of some of the block domains are proximate with each other.

5. The layout-generation method as claimed in claim 1, wherein the multilevel groups are obtained from the hypergraph based on the first cost function, and the first cost function comprises degrees of the hypergraph and weight of the linkages to evaluate cost of each of the multilevel groups.

6. The layout-generation method as claimed in claim 5, wherein in the operation of continuing partitioning the hypergraph, the first cost function is applied to calculate the cost each time the hypergraph is partitioned, and multilevel groups are determined when a minimum cost is determined.

7. The layout-generation method as claimed in claim 1, wherein verifying the layout to fabricate the IC comprises evaluating a constraints coverage and a routing coverage, the constraints coverage indicates amount of the constraints which are observed, and the routing coverage is a ratio between first automatic routing of the multilevel groups and final routing of the multilevel groups.

8. The layout-generation method as claimed in claim 1, wherein the floorplanning is utilized to decide on a horizontal arrangement or a vertical arrangement for the multilevel groups to generate the layout.

9. The layout-generation method as claimed in claim 8, wherein the second cost function is utilized to evaluate total cost of all of the multilevel groups each time the floorplanning is applied, and the second cost function comprises areas of the multilevel groups, wirelengths between the multilevel groups and aspect ratios of the multilevel groups, and the layout is generated when a minimum total cost is determined.

10. A layout-generation method for fabricating an integrated circuit (IC), comprising:
    accessing data of a schematic design of the IC;
    extracting weighted edges from a plurality of constraints;
    generating a hypergraph with weighted edges to represent the schematic design and the constraints;
    partitioning the hypergraph into a plurality of multilevel groups associated with the weighted edges during a partitioning stage, wherein the multilevel groups represent a plurality of electronic components and a plurality of linkages connecting the electronic components of the schematic design; and
    after the partitioning stage, executing floorplanning to arrange positions of the multilevel groups during a floorplanning stage, so as to generate a layout, wherein the partitioning during the partitioning stage and the floorplanning during the floorplanning stage are executed in association with different cost functions respectively; and
    fabricating the IC after generating the layout.

11. The layout-generation method as claimed in claim 10, further comprising verifying the layout to fabricate the IC by evaluating a constraints coverage and a routing coverage, the constraints coverage indicates amount of the constraints which are observed, and the routing coverage is the ratio between first automatic routing and final routing.

12. The layout-generation method as claimed in claim 10, wherein the hypergraph comprises a plurality of block domains representing the electronic components of the schematic design and the linkages connecting the block domains, and the weighted edges are assigned in some of the linkages to indicate degree of constraint.

13. The layout-generation method as claimed in claim 12, wherein the constraints comprise symmetry constraints and proximity constraints, the symmetry constraints indicate that a group of the block domains is symmetric with another group of the block domains, and the proximity constraints indicate that arrangements of some of the block domains are proximate with each other.

14. The layout-generation method as claimed in claim 10, wherein the floorplanning is utilized to decide on a horizontal arrangement or a vertical arrangement for the multilevel groups to generate the layout.

15. A non-transitory computer-readable medium containing instructions which, when executed by a processor of a computer system, cause the processor to execute a layout-generation method for fabricating an integrated circuit (IC) comprising:
    accessing data of a schematic design of the IC;
    extracting weighted edges from a plurality of constraints;
    generating a hypergraph with weighted edges to represent the schematic design and the constraints;
    partitioning the hypergraph into a plurality of multilevel groups associated with the weighted edges during a partitioning stage, wherein the multilevel groups represent a plurality of electronic components and a plurality of linkages connecting the electronic components of the schematic design;
    after the partitioning stage, executing floorplanning to arrange positions of the multilevel groups during a floorplanning stage, so as to generate a layout, wherein at least two different cost functions are utilized to evaluate the partitioning during the partitioning stage and the floorplanning during the floorplanning stage respectively; and
    fabricating the IC after generating the layout.

16. The non-transitory computer-readable medium as claimed in claim 15, wherein the layout-generation method further comprises verifying the layout to fabricate the IC by evaluating a constraints coverage and a routing coverage, the constraints coverage indicates amount of the constraints which are observed, and the routing coverage is the ratio between first automatic routing and final routing.

17. The non-transitory computer-readable medium as claimed in claim 15, wherein the hypergraph comprises a plurality of block domains representing the electronic components of the schematic design and the linkages connecting the block domains, and the weighted edges are assigned in some of the linkages to indicate degree of constraint.

18. The non-transitory computer-readable medium as claimed in claim 17, wherein the constraints comprise symmetry constraints and proximity constraints, the symmetry constraints indicate that a portion of the block domains is symmetric with another portion of the block domains, and the proximity constraints indicate that arrangements of some of the block domains are proximate with each other.

19. The non-transitory computer-readable medium as claimed in claim 15, wherein the floorplanning is utilized to decide on a horizontal arrangement or a vertical arrangement for the multilevel groups to generate the layout.

20. The layout-generation method as claimed in claim 10, wherein the cost functions are utilized for continuing partitioning the hypergraph by the weighted edges until the multilevel groups and the linkages are obtained, or utilized for floorplanning on the multilevel groups to arrange positions of the multilevel groups.

* * * * *